United States Patent [19]
Thompson

[11] Patent Number: 5,451,927
[45] Date of Patent: Sep. 19, 1995

[54] AUTOMOTIVE FUEL FILLER PIPE CAP DETECTION SYSTEM

[75] Inventor: Robert H. Thompson, Redford, Mich.

[73] Assignee: Ford Motor Company, Dearborn, Mich.

[21] Appl. No.: 106,674

[22] Filed: Aug. 16, 1993

[51] Int. Cl.⁶ .............................................. B60Q 1/00
[52] U.S. Cl. .................. 340/457; 220/86.2; 220/DIG. 33; 340/438
[58] Field of Search .............. 340/686, 457, 425.5, 340/438, 439; 123/198 D; 220/DIG. 33, 746, 86.2, 366, 367; 73/40

[56] References Cited
U.S. PATENT DOCUMENTS

| | | |
|---|---|---|
| 2,019,393 | 10/1935 | Carah . |
| 2,683,782 | 7/1954 | Corssen . |
| 2,767,392 | 10/1956 | Szwargulski . |
| 3,026,004 | 3/1962 | Rowell . |
| 3,572,305 | 3/1971 | Moragne . |
| 3,792,435 | 2/1974 | Pace et al. . |
| 3,878,507 | 4/1975 | Medlock . |
| 4,583,072 | 4/1986 | Matsushita .................... 340/686 |
| 4,690,293 | 9/1987 | Uranishi et al. ................ 220/86.2 |
| 4,877,146 | 10/1989 | Harris .......................... 220/86.2 |

*Primary Examiner*—Brent Swarthout
*Attorney, Agent, or Firm*—David B. Kelley; Roger L. May

[57] ABSTRACT

An automotive fuel filler pipe cap detection system has a filler pipe cap retainer on the end of the filler pipe for retaining the filler pipe cap, a passage through the cap retainer with a line outlet leading to a vacuum line connected to a manifold, and a seal outlet leading to the underside of the fuel cap when it is in place. Vacuum is generated in the vacuum line when the engine is started with the cap covering the seal outlet. A two position pressure switch connected to the vacuum line is in a first position when vacuum is sensed in the vacuum line and a second position when vacuum pressure is not sensed. A "fuel cap missing" indicator is lit to warn the operator when the switch is in the second position.

17 Claims, 1 Drawing Sheet

AUTOMOTIVE FUEL FILLER PIPE CAP DETECTION SYSTEM

FIELD OF THE INVENTION

This invention relates to automotive evaporative emissions control systems, and more particularly to a system for sensing the presence of an automotive fuel filler pipe cap.

BACKGROUND OF THE INVENTION

Regulatory requirements mandate the implementation of a leak detection system for automotive evaporative emissions (EVAP) control systems, in which the detection system must light a malfunction indicator when a leak of sufficient size is detected. Should a fuel filler pipe cap not be replaced after refueling, the leak detection system would detect the missing cap as a leak in the EVAP system and light the indicator. Such a common oversight as failure to replace the filler cap, however, is not in actuality a leak in the EVAP system intended to be monitored by the system and essentially amounts to a false leak indication. Because an excessive number of EVAP repairs may trigger a recall for a given make of automobile, it is desirable to distinguish operator error from actual leaks. As such, the regulatory agencies in question allow the separate detection and indication of a missing fuel filler pipe cap in order to prevent unneeded service to the EVAP system.

Various mechanically actuated filler cap detection switches have been devised, including U.S. Pat. Nos. 4,583,072 (Matsushita), 2,019,393 (Carah), and 3,572,305 (Moragne). A drawback of such devices is that contamination can collect on their moving parts causing them to stick and malfunction. Other mechanically operated devices for preventing unauthorized access to the fuel tank disclosed in U.S. Pat. Nos. 3,878,507 (Medlock) and 3,792,435 (Pace, et. al.). These also have the disadvantages discussed above.

SUMMARY OF THE INVENTION

The present invention provides a novel means of detecting the presence or absence of an automotive fuel filler pipe cap without the mechanical switch drawbacks of previous inventions. This filler pipe cap detection system consists of a line or hose connected between a vacuum source, typically the inlet manifold of the engine, and a cored passage through the fuel filler pipe cap retainer. A pressure switch is connected to the line. The cored passage passes from the line, through the cap retainer, to the filler cap seat. The cored passage is configured such that when the filler pipe cap is in place the passage is blocked by the filler pipe cap seal. When the cap is not installed, the passage is open. After the engine is started, vacuum is generated in the line. If the filler pipe cap is in place, sufficient vacuum pressure exists in the line so that the pressure switch is positioned to a first position which is electrically relayed to the on-board computer and prevents the "fuel cap missing" indicator from lighting. However, should the filler pipe cap be missing, insufficient vacuum pressure would exist in the line and the pressure switch would move to a second position. The on-board computer would sense this and light the "fuel cap missing" indicator.

The present invention provides a filler pipe cap detection system for an automobile having an engine and a fuel tank. The system has a fuel filler pipe having a tank end in fluid communication with the fuel tank, and a filler end for receiving fuel from a fuel source, a fuel filler pipe cap removably attachable to the filler end of the filler pipe, a line having a vacuum end connected to a vacuum source, and a cap end abutable to the cap such that the cap obstructs air flow to the line when the cap is attached to the filler pipe, such that air is able to flow through the line when the cap is removed, and means for sensing vacuum pressure in the line and for switching between a first position and a second position dependent upon pressure in the line, with the means for sensing and switching in the first position when vacuum pressure is sensed in the line and in the second position when vacuum pressure is not sensed in the line. The means for sensing and switching sends an electrical signal to a means for lighting an indicator when in the second position. The means for lighting the indicator does not light the indicator when the means for sensing and switching is in the first position.

Therefore, an object of the present invention is to provide a fuel filler pipe cap detection system which utilizes a vacuum line and a pressure switch to detect fuel cap presence.

A further object of the present invention is to provide a fuel filler pipe cap detection system which more safely detects fuel cap presence without use of mechanically operated position switches.

DETAILED DESCRIPTION OF THE PREFERRED EMBODIMENT

Figure 1:
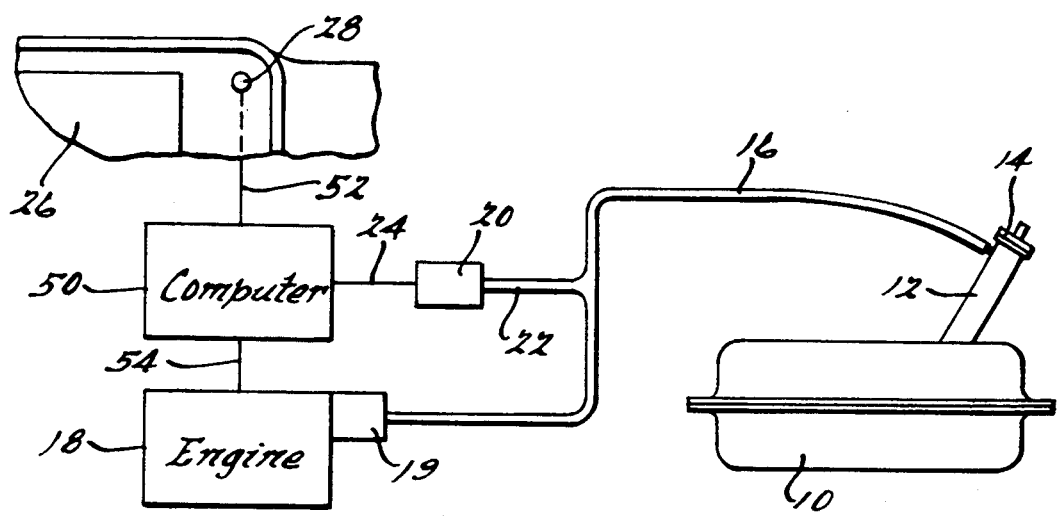
FIG. 1 is a schematic diagram of the present invention showing the connection of the pressure switch and vacuum line to the automotive components.

FIG. 1 shows schematically the automotive fuel filler pipe cap detection system of the present invention. A fuel tank 10 has a filler pipe 12, which may be steel or other such material, which carries fuel from a fuel source (not shown), typically the nozzle of a gasoline fuel pump, to tank 10. A filler pipe cap 14 covers pipe 12, ideally at all times except when refueling. Cap 14 is preferably made of a plastic material, such as acetyl or a similar polymer. A vacuum line 16 attaches to a vacuum source on one end, such as the intake manifold 19 of engine 18, and to filler pipe 12 on the other end such that cap 14, when installed, obstructs air flow to line 16. An inlet 22 leads to a pressure switch 20 which senses vacuum pressure in line 16. Pressure switch 20 is electrically connected to a "fuel cap missing" indicator (not shown) in a location viewable by the operator, preferably the dashboard 26.

Figure 2:
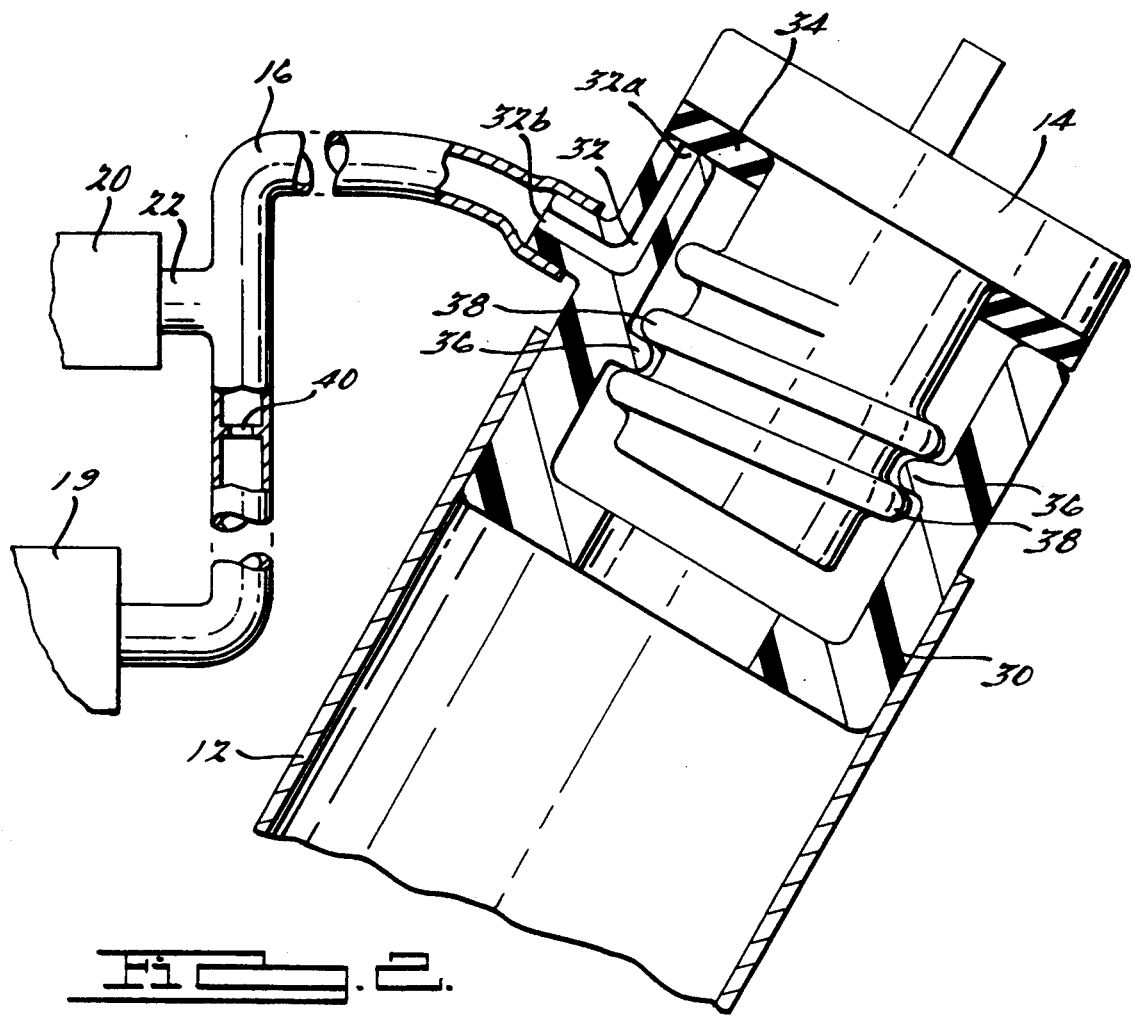
FIG. 2 is a detailed view of the filler pipe cap and cored retainer cap passage of the present invention.

FIG. 2 shows a detailed view of the preferred embodiment of the present invention. Filler pipe 12 has a cap retainer 30 affixed to the filler end. Cap retainer 30, preferably made of a plastic material, such as acetyl or other polymer, has a cored passage 32 with a seal outlet 32a and a line outlet 32b. When cap 14 is attached, a seal 34, located on the filler pipe side of cap 14, prevents air from passing into seal outlet 32a, through line outlet 32b, and into line 16. Seal 34 is preferably made of an elastomer, such as rubber. When cap 14 is not attached to cap retainer 30, air can pass into seal outlet 32a, to line outlet 32b, and into line 16. Cap 14 has cap threads 38 which screw into retainer threads 36.

Line 16, for example a nylon tube or hose, connects, preferably in press-on fashion, to line outlet 32b on one end and runs to manifold 19 where it draws a vacuum when engine 18 is operated. A separate switch inlet line 22 leads from line 16 to pressure switch 20. Pressure switch 20 has an electrical connection 24 which leads to a means for lighting a "fuel cap missing" indicator, preferably on the dashboard 26 in the passenger compartment of the automobile. Such a means can be, for example, an onboard engine computer 50. Computer 50 has electrical connection 52 to dashboard 26 and an electrical connection 54 to engine 18. Pressure switch 20 is a two state device having a first and a second position. Its operation is further explained below.

A calibrated orifice 40 is placed in line 16 upstream of switch inlet line 22 to limit flow of unmetered air, in the event cap 14 does not obstruct seal outlet 32a, in order to avoid a degradation of engine 18 idle quality.

The fuel cap detection system operates as follows. When cap 14 is installed, that is, when cap 14 is screwed into cap retainer 30, seal outlet 32a is blocked by seal 34. After engine 18 is started, a vacuum is drawn on line 16 since air cannot pass into seal outlet 32a. Pressure switch 20 senses the vacuum pressure in line 16 through switch line 22 and switches to the first position. This position of pressure switch 20 is electronically communicated to the on-board computer 50 by electrical line 24 and computer 50 does not generate a signal to light the "fuel cap missing" indicator on dashboard 26.

If cap 14 is not installed, for example if the operator forgets to replace it after refueling, or if the cap 14 is improperly installed such that seal 34 does not adequately contact cap retainer 30, air will pass into seal outlet 32a, through cored passage 32, out line outlet 32b, and to line 16. Pressure switch 20 will not sense a vacuum and thus will switch to the second position. Computer 50 receives a signal that pressure switch 20 is in the second position and thus generates a signal to light the "fuel cap missing" indicator on dashboard 26.

Although the preferred embodiment of the present invention has been disclosed, various changes and modifications may be made without departing from the scope of the invention as set forth in the appended claims.

I claim:

1. A filler pipe cap detection system for an automobile having an engine and a fuel tank, comprising:
   a fuel filler pipe having a tank end in fluid communication with said fuel tank, and a filler end for receiving fuel from a fuel source;
   a fuel filler pipe cap removably attachable to said filler end of said filler pipe;
   a line having a vacuum end connected to a vacuum source, and a cap end abutable to said cap such that said cap obstructs air flow to said line when said cap is attached to said filler pipe and such that air is able to flow through said line when said cap is removed; and
   means for sensing vacuum pressure in said line and for switching between a first position and a second position dependent upon pressure in said line, said means for sensing and switching in said first position when vacuum pressure is sensed in said line and in said second position when vacuum pressure is not sensed in said line, said means for sensing and switching comprising a pressure switch which sends an electrical signal to a means for lighting an indicator when in said second position.

2. A fuel cap detection system according to claim 1 wherein said vacuum source is an intake manifold of said engine.

3. A fuel cap detection system according to claim 1 wherein a cap retainer is attached to said filler end of said filler pipe for receiving and retaining said cap, said cap retainer having a passage with a line outlet to which said cap end attaches, and a seal outlet abutable to said cap such that said cap obstructs air flow to said passage when said cap is attached to said cap retainer, such that air is able to flow through said passage to said line when said cap is removed.

4. A fuel cap detection system according to claim 3 wherein said fuel cap has a seal attached to a filler pipe side of said cap, said seal covering said seal outlet of said passage of said cap retainer when said cap is attached to said cap retainer.

5. A fuel cap detection system according to claim 3 wherein said fuel cap has a threaded section which screws into a thread receiving portion of said cap retainer.

6. A fuel cap detection system according to claim 1 wherein said line has an orifice for limiting flow of unmetered air to said engine, said orifice located between said engine and an inlet leading to said pressure switch.

7. A fuel cap detection system according to claim 1 wherein said means for lighting is an onboard computer connected to said indicator on a dashboard within said automobile.

8. A filler pipe cap detection system for an automobile having an engine and a fuel tank, comprising:
   a fuel filler pipe having a tank end in fluid communication with said fuel tank, and a filler end for receiving fuel from a fuel source;
   a fuel filler pipe cap removably attachable to said filler end of said filler pipe;
   a cap retainer fixedly attached to said filler end of said filler pipe, said retainer having means for attachment to said fuel filler pipe cap;
   a passage in said cap retainer having a seal end and a line end, said seal end abutable to said cap such that said cap obstructs air flow to said passage when said cap is attached to said cap retainer, air able to flow through said passage when said cap is removed;
   a line connecting said line end of said passage with a vacuum source; and
   means for sensing vacuum pressure in said line and for switching between a first position and a second position dependent upon pressure in said line, said means for sensing and switching is a pressure switch in said first position when vacuum pressure is sensed in said line and in said second position when vacuum pressure is not sensed in said line, said means for sensing and switching sending an electrical signal to a means for lighting an indicator when in said second position.

9. A fuel cap detection system according to claim 8 wherein said vacuum source is an intake manifold of said engine.

10. A fuel cap detection system according to claim 8 wherein said fuel cap has a threaded section which screws into a thread receiving portion of said cap retainer.

11. A fuel cap detection system according to claim 8 wherein said line has an orifice for limiting flow of unmetered air to said engine, said orifice located between said engine and an inlet leading to said pressure switch.

12. A fuel cap detection system according to claim 8 wherein said means for lighting is an onboard computer connected to said indicator on a dashboard within said automobile.

13. A method for detecting the presence of a fuel filler pipe cap of an automobile having an engine and a fuel tank, comprising:
providing a fuel filler pipe having a tank end in fluid communication with said fuel tank, and a filler end for receiving fuel from a fuel source;
fixedly attaching a cap retainer to said filler end of said filler pipe for receiving and retaining a filler pipe cap, said filler pipe cap removably attachable to said cap retainer;
coring a passage in said cap retainer such that said passage has a line outlet and a seal outlet;
connecting a line having a vacuum end and a cap end to a vacuum source and to said line outlet of said cap retainer, respectively;
positioning said seal outlet such that said filler cap obstructs air flow to said seal outlet when said filler cap is attached to said cap retainer, air able to flow into said seal outlet, through said passage, into said line outlet, and into said line when said cap does not obstruct said seal outlet; and
sensing vacuum pressure in said line and switching between a first position and a second position dependent upon pressure in said line with a means for sensing and switching, said means for sensing and switching in said first position when vacuum pressure is sensed in said line and in said second position when vacuum pressure is not sensed in said line, said means for sensing and switching comprising a pressure switch which sends an electrical signal to a means for lighting an indicator when in said second position.

14. A method according to claim 13, further including the step of generating vacuum for said vacuum source with an intake manifold of said engine.

15. A method according to claim 13, further including the step of removably attaching said filler cap to said cap retainer with a threaded section on said filler cap which screws into a thread receiving portion of said cap retainer.

16. A method according to claim 13, further including the step of limiting flow of unmetered air to said engine by placing an orifice between said engine and an inlet leading to said pressure switch.

17. A method according to claim 13, further including the step of lighting said indicator by electrically relaying the absence of vacuum pressure in said line to an onboard computer connected to said indicator on a dashboard within said automobile.

* * * * *